(12) United States Patent
Lim et al.

(10) Patent No.: US 10,312,533 B2
(45) Date of Patent: Jun. 4, 2019

(54) ACTIVATION APPARATUS OF FUEL CELL STACK FOR PERFORMING AUTOMATIC ACTIVATION AND PERFORMANCE EVALUATION

(71) Applicant: HYUNDAI MOTOR COMPANY, Seoul (KR)

(72) Inventors: Junhong Lim, Seoul (KR); Daekeun Chun, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 917 days.

(21) Appl. No.: 14/836,719

(22) Filed: Aug. 26, 2015

(65) Prior Publication Data

US 2016/0164131 A1  Jun. 9, 2016

(30) Foreign Application Priority Data

Dec. 8, 2014  (KR) .................. 10-2014-0175100

(51) Int. Cl.
| | |
|---|---|
| *H01M 8/04082* | (2016.01) |
| *H01M 8/0438* | (2016.01) |
| *H01M 8/04537* | (2016.01) |
| *H01M 8/04664* | (2016.01) |
| *H01M 8/04746* | (2016.01) |
| *H01M 8/1018* | (2016.01) |

(52) U.S. Cl.
CPC ... *H01M 8/04201* (2013.01); *H01M 8/04395* (2013.01); *H01M 8/04552* (2013.01); *H01M 8/04559* (2013.01); *H01M 8/04679* (2013.01); *H01M 8/04753* (2013.01); *H01M 2008/1095* (2013.01); *H01M 2250/20* (2013.01); *Y02T 90/32* (2013.01)

(58) Field of Classification Search
CPC ...... H01M 8/02; H01M 8/04; H01M 8/04223; H01M 8/04225; H01M 8/04298; H01M 8/043; H01M 8/04302; H01M 8/04313
See application file for complete search history.

(56) References Cited

FOREIGN PATENT DOCUMENTS

| | | |
|---|---|---|
| JP | 2003-151613 A | 5/2003 |
| JP | 2010-061831 A | 3/2010 |
| JP | 4978469 B2 | 7/2012 |
| KR | 10-0666782 B1 | 1/2007 |

OTHER PUBLICATIONS

English machine translation of Watanabe (JP 4978469 equivalent WO 2007/034959), published on Mar. 29, 2007.*
English machine translation of Tominaga (JP 2010-061831), published on Mar. 18, 2010.*

* cited by examiner

*Primary Examiner* — Christina Chern
(74) *Attorney, Agent, or Firm* — Morgan Lewis & Bockius LLP

(57) ABSTRACT

An activation apparatus of a fuel cell stack includes an output cable connecting unit mounted on the frame and connecting a positive output cable of an electric load system to a positive output terminal at one side of the fuel cell stack. A fluid supply pipe connecting unit is mounted on the frame to reciprocate forward and backward with respect to another side of the fuel cell stack. The fluid supply pipe connecting unit connects a negative output cable of the electric load system to a negative output terminal at the other side of the fuel cell stack and connects a fluid supply pipe of a fluid supply system to a manifold of the fuel cell stack.

20 Claims, 19 Drawing Sheets

ACTIVATION APPARATUS OF FUEL CELL STACK FOR PERFORMING AUTOMATIC ACTIVATION AND PERFORMANCE EVALUATION

CROSS-REFERENCE TO RELATED APPLICATION

This application claims the benefit of priority to Korean Patent Application No. 10-2014-0175100 filed in the Korean Intellectual Property Office on Dec. 8, 2014, the entire content of which is incorporated herein by reference.

TECHNICAL FIELD

The present disclosure relates to a system for activating a fuel cell stack, and more particularly, to an activation apparatus of a fuel cell stack which enables automatic activation and performance evaluation of the fuel cell stack.

BACKGROUND

A fuel cell includes an electrode that provokes an electrochemical reaction between a fuel and an oxidizing agent, a polymer electrolyte membrane that transfers protons generated by the reaction, and a separator that supports the electrode and the polymer electrolyte membrane.

In general, a polymer electrolyte fuel cell is used as the fuel cell for a vehicle since it has high efficiency, high current and output densities, and a short starting time. Further, the polymer electrolyte fuel cell does not corrode, and does not need to regulate an electrolyte because it uses a polymer electrolyte, compared to other types of fuel cells.

In addition, since the polymer electrolyte fuel cell is an environmentally friendly power source that produces no exhaust emission except pure water, research has been extensively conducted in this field.

Such an electrolyte fuel cell may generate electrical energy while generating water and heat through an electrochemical reaction between a fuel including hydrogen and an oxidizing agent such as air.

In other words, in the electrolyte fuel cell, the fuel is divided into hydrogen ions and electrons in a catalyst of the anode electrode, and the hydrogen ions cross over to a cathode through a polymer electrolyte membrane such that electrical energy is generated and water is produced from the combination of the oxidizing agent and the electrons injected from external wires.

In a fuel cell used for a vehicle, individual unit cells are stacked to obtain a required potential, and the stacked structure of unit cells is referred to as a stack.

The electrode of the fuel cell is formed by mixing a hydrogen ion carrier and a catalyst, and the activity of the electrochemical reaction may decrease in an initial operation after the fuel cell is manufactured because a transfer port is blocked and the carrier may not reach the catalyst. Further, the carrier of hydrogen ions forming a triple phase interface is not easily hydrolyzed in the initial operation, and continuous mobility of the hydrogen ions and the electrons is difficult to secure.

Accordingly, activation and performance evaluation of the fuel cell stack are performed to secure the performance of the fuel cell after assembling a membrane-electrode assembly including the electrode, the polymer electrolyte membrane, and the stack which is an assembly of fuel cells for generating electricity including separators.

The activation and performance evaluation remove remaining impurities that flow in a process of manufacturing the membrane-electrode assembly and the stack, activate sites that do not participate in the reaction, secure a passage in which reactants move to the catalyst, and secure a hydrogen ion passage by sufficiently hydrolyzing an electrolyte included in the polymer electrolyte membrane and the electrode.

The above described activation of the fuel cell stack has been applied in various methods of the related art. The main method of activation is to detect a voltage of the fuel cell while operating the stack for a substantial period of time under a predetermined voltage.

Accordingly, a system for activating the fuel cell stack according to the related art may perform the activation of the fuel cell stack and evaluation by supplying the fuel and the oxidizing agent into the fuel cells after manufacturing the stack in which a plurality fuel cells are layered, and by monitoring the voltage of the fuel cells while applying the electrical energy generated by the fuel cells to an electric load apparatus.

In activating the fuel cell stack and evaluating the performance, connectors of a voltage measuring system are connected to a terminal that protrudes from each fuel cell. An output cable connected to the electric load apparatus is connected to output terminals at both sides of the stack, and a fluid supply pipe for supplying fluids (e.g., hydrogen, air, and coolant) is connected to a manifold of the stack.

In the process of connecting the connectors of the voltage measurement system to the terminals that protrude from each fuel cell of the stack, the connectors and the terminals of each fuel cell are manually connected. Accordingly, in the related art, the connectors of the voltage measuring system are manually connected to the terminals of the stack, thus deteriorating workability. Further, a long period of time is required for the overall process for connecting the connectors and the terminals, and stack damage may occur when connecting the terminals.

In addition, in the process of connecting the output cables connected to the electric load apparatus to the output terminals at both sides of the stack, a worker clamps a bus bar connected to the electric load apparatus and the output cable to the output terminal of both sides of the stack with a bolt. Accordingly, in the related art, when manually connecting and detaching the output cable to/from the output terminal on both sides of the stack, he worker may be exposed to a danger of electric shock. In other words, since a current may be generated due to the electro-chemical reaction between remaining hydrogen and air even when supply of the hydrogen and air to the stack discontinues, an accidental electric shock of a worker may be induced when detaching the output cable from the terminal.

Further, in the process of connecting the fluid supply pipe for supplying fluids to the fuel cells of the stack to the manifold of the stack, the stack is connected to the fluid supply pipe of an activating device by manually pushing the stack. Accordingly, in the related art, workability may be deteriorated, and air-tightness may not be secured when connecting the fluid supply pipe to the stack manifold since the stack weighting dozens of kilograms is connected to the fluid supply pipe of the activating device by manually pushing.

The above information disclosed in this Background section is only for enhancement of understanding of the background of the invention, and therefore, it may contain information that does not form the prior art that is already known in this country to a person of ordinary skill in the art.

SUMMARY

An aspect of the present inventive concept provides an activation apparatus of a fuel cell stack which enables automatic activation and performance evaluation of the fuel cell stack to be unmanned and automated, and responds to the process mass production of automatic assembly of a vehicle equipped with the fuel cell.

Another aspect of the present inventive concept provides an activation apparatus of a fuel cell stack which enables a voltage measuring connector, an output cable, and a fluid supply pipe to be simultaneously connected in an automated process.

An activation apparatus of a fuel cell stack according to an exemplary embodiment of the present inventive concept may include an output cable connecting unit mounted on a frame and connecting a positive output cable of an electric load system to a positive output terminal at one side of the fuel cell stack. A fluid supply pipe connecting unit is mounted on the frame to reciprocate forward and backward with respect to another side of the fuel cell stack. The fluid supply pipe connecting unit connects a negative output cable of the electric load system to a negative output terminal at the other side of the fuel cell stack and connects a fluid supply pipe of a fluid supply system to a manifold of the fuel cell stack.

The fluid supply pipe connecting unit may include a moving body reciprocating forward and backward with respect to the other side of the fuel cell stack by an actuator. A connecting terminal set is elastically installed in the moving body and is connected to the negative output terminal of the fuel cell stack. A pipe connecting part is disposed at the moving body and connected to the fluid supply pipe.

The connecting terminal set may include a cable connecting member fixedly installed in the moving body and connected to the electric load equipment via the negative output cable. A terminal rod protrudes outwardly from inside the cable connecting member and moves toward the other side of the fuel cell stack. A connecting terminal is installed at a protruding end of the terminal rod. A spring is installed between the cable connecting member and the terminal rod and applies elastic force to the terminal rod.

The connecting terminal may be inserted into a terminal hole disposed at the other side of the fuel cell stack, and have a tapered outer circumference.

A supporting member may be installed at the protruded end of the terminal rod and have a disk shape to support the negative output terminal of the fuel cell stack.

The moving body may move back and forth with respect to the other side of the fuel cell stack via a pair of guide bars.

The pair of guide bars may be inserted into a pair of supporting blocks which are fixed on the frame.

A moving block may move back and forth with respect to the other side of the fuel cell stack by the actuator on the frame.

Stoppers may protrude at both sides of the moving block.

A stopping block may be engaged with the stopper an end of the guide bars.

A fixed block may be fixedly installed on the moving block.

A rod cell may be in contact with the fixed block in the moving body.

The supply pipe connecting unit may further include an air-tightness testing unit for testing air-tightness of the fuel cell stack.

The air-tightness testing unit may include an air supply source configured to supply air to the pipe connecting part. An air pressure regulator is configured to regulate air pressure supplied to the pipe connecting part. A flow meter is configured to measure flow rate of the supplied air. A pressure sensor is configured to detect the air pressure exerted to inside of the fuel cell stack.

The output cable connecting unit may include a moving body reciprocating forward and backward with respect to the one side of the fuel cell stack by an actuator. A connecting terminal set is elastically installed in the moving body and connected to the positive output terminal of the fuel cell stack.

The exemplary embodiments of the present inventive concept may enable automated activation and performance evaluation of the fuel cell stack by the connector connecting unit, the output cable connecting unit, and the fluid supply pipe connecting unit in a multiple channel manner.

In addition, since the voltage measuring connector, the output cable, and the fluid supply pipe may be simultaneously connected in the automated process, the activation apparatus may more flexibly respond to the process of mass production of automatic assembly of fuel cell vehicles.

Further, since the activation and performance evaluation of the fuel cell stack are automatically performed, workability may be improved, damage to the fuel cell stack and an electric shock accident of a worker may be prevented, and air-tightness of the fuel cell stack may be secured while supplying fluid.

BRIEF DESCRIPTION OF THE DRAWINGS

The drawings are referenced for describing the exemplary embodiments, and the inventive concept of the present invention should be interpreted as being limited to the accompanying drawings.

DETAILED DESCRIPTION OF THE EMBODIMENTS

Figure 1:
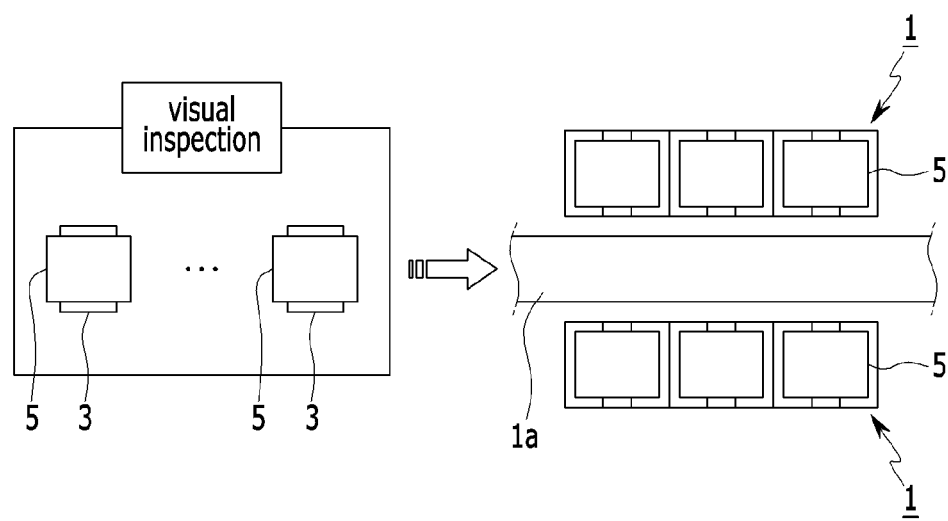
FIG. 1 is a block diagram schematically illustrating a process for activating a fuel cell stack in which an activation apparatus of a fuel cell stack according to an exemplary embodiment of the present inventive concept is applied.

Hereinafter, the present disclosure will be described in detail with reference to the accompanying drawings, in which exemplary embodiments of the invention are shown. However, the present disclosure may be implemented in various forms, and the scope of the present disclosure is not limited the embodiments described herein.

In the drawings, to clearly describe the present disclosure, parts not related to the description are omitted, and the same reference numerals are designated for identical or similar elements throughout the specification.

The size and thickness of each element shown in drawings are arbitrarily shown for convenience of description, but the scope of the present disclosure is not necessarily limited to the drawings, and the thickness is magnified to clearly express several parts and regions.

In the detailed description, elements are distinguished by first, second, etc. to distinguish the elements, but they are not necessarily limited to the order in the description, and the expression of first, second, etc. is deleted in the claims.

When a part "includes" a certain element, this means that the part may not exclude other elements but may further include them throughout the specification, unless a specific opposite description is presented.

In addition, terms such as "unit," "means," "part," "member," etc. described in the specification mean a unit that processes at least one function or operation.

FIG. 1 is a block diagram schematically illustrating a process for activating a fuel cell stack in which an activation apparatus of a fuel cell stack according to an exemplary embodiment of the present inventive concept is applied.

Referring to FIG. 1, an activation apparatus 1 of a fuel cell stack according to an exemplary embodiment of the present inventive concept may secure performance of a fuel cell stack 5 in which a plurality of fuel cells (hereinafter referred to as a "unit cell") are stacked. In other words, the activation apparatus 1 may activate a unit cell constructing the fuel cell stack 5 and evaluate performance thereof.

For example, in the activation apparatus 1, activation of a membrane-electrode assembly and evaluation of performance may be performed by supplying hydrogen, air, and coolant to each unit cell, and by applying a predetermined voltage to an electric load from the unit cell.

Particularly, the activation apparatus 1 may supply hydrogen, air, and coolant to each unit cell of the fuel cell stack 5, and apply electrical energy generated by an electrochemical reaction between the hydrogen and the air in the unit cells to an electric load device through an output cable.

The activation apparatus 1 may further detect failure of the fuel cell stack 5 by measuring a voltage of the unit cells applied to the electric load device, using a cell voltage measuring system.

The process of activating the fuel cell stack 5 and evaluating the performance in which the activation apparatus 1 is applied may be performed after the fuel cell stack 5 is manufactured.

In describing the process of activating the fuel cell stack 5 and evaluating the performance in which the activation apparatus 1 is applied, according to an exemplary embodiment of the present inventive concept, a visual inspection of the fuel cell stack 5 transferred by a carrier 3 may be performed.

After finishing the visual inspection of the fuel cell stack 5, the fuel cell stack 5 may be transferred to the activation apparatus 1 of the fuel cell stack and the process of activating the fuel cell stack 5 and evaluating the performance may be automatically performed using the activation apparatus 1.

Herein, the activation apparatus 1 according to the present disclosure may be disposed in two channels for the process of activating the fuel cell stack 5 and evaluating the performance. In other words, a plurality of activation apparatuses 1 may be disposed in two channels spaced apart with the transfer path 1a of the fuel cell stack 5 therebetween.

The activation apparatus 1 of the fuel cell stack according to the present disclosure as described above may include a structure that enables the automatic activation process of activating the fuel cell stack 5 and the performance evaluation in a multiple channel manner.

In other words, the exemplary embodiments of the present inventive concept provide the activation apparatus 1 of the fuel cell stack which may automatically and simultaneously connect a voltage measure connector for the fuel cell stack 5, an output cable, and a fluid supply pipe.

Figure 2A:
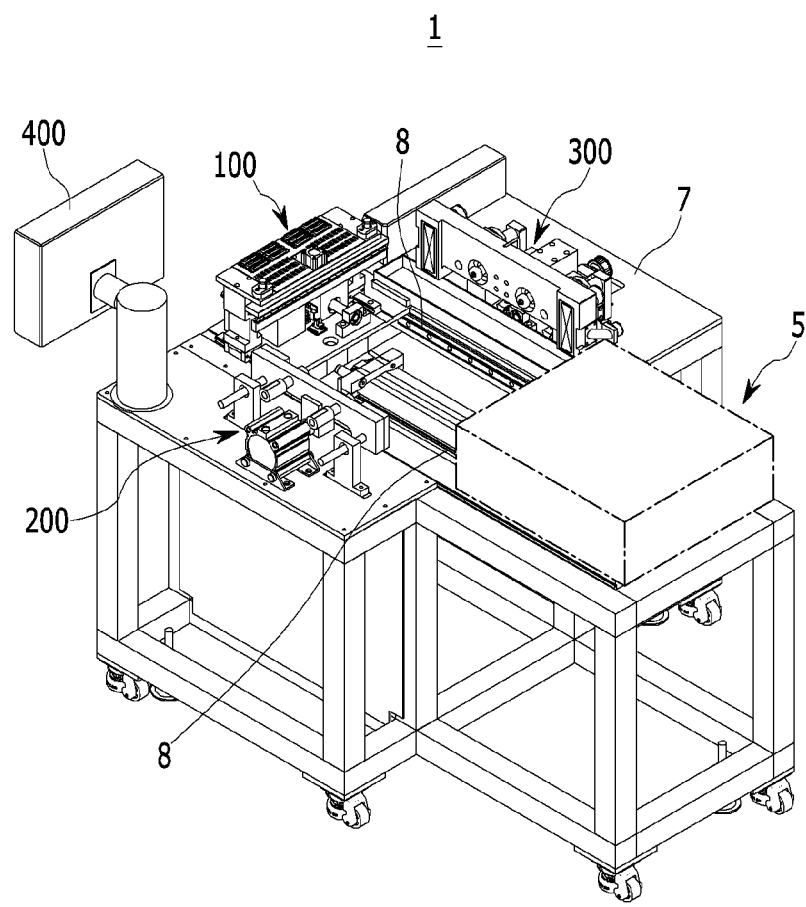
FIG. 2A is a view illustrating an activation apparatus of a fuel cell stack according to an exemplary embodiment of the present inventive concept.
Figure 2B:
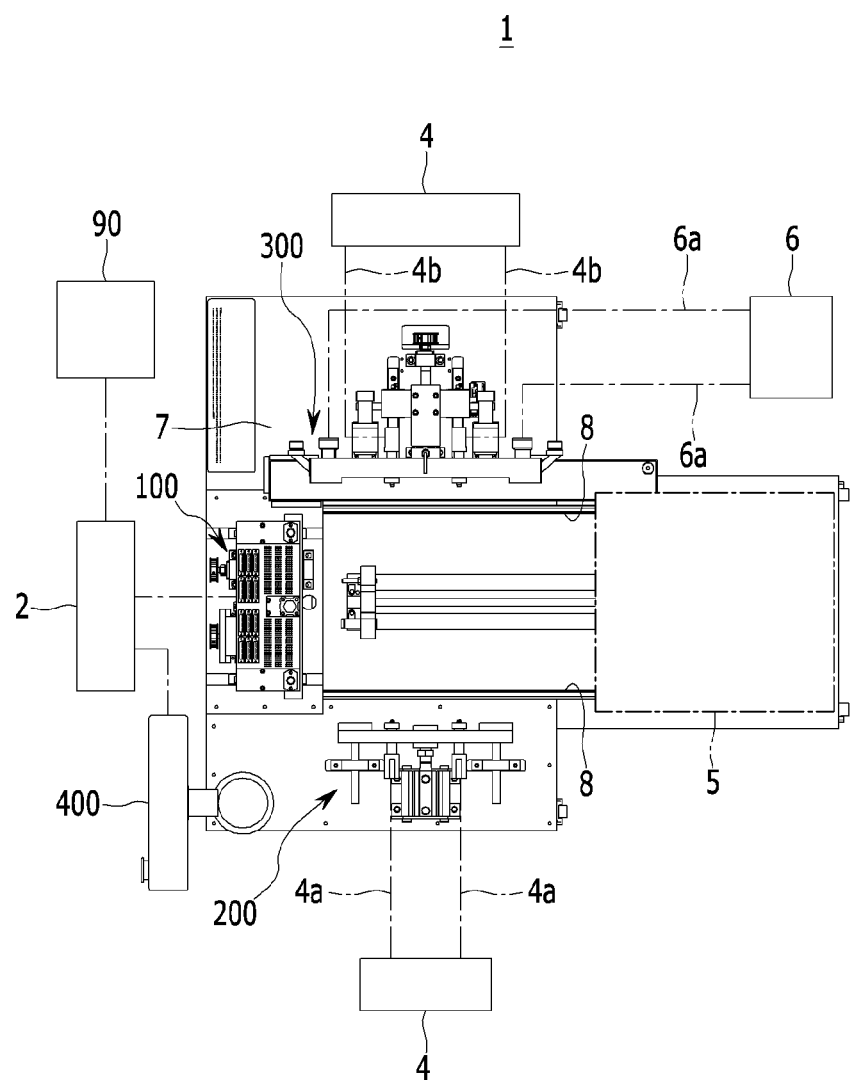
FIG. 2B is a plane schematic diagram illustrating an activation apparatus of a fuel cell stack according to an exemplary embodiment of the present inventive concept.

FIG. 2A is a view illustrating an activation apparatus of a fuel cell stack according to an exemplary embodiment of the present inventive concept, and FIG. 2B is a plan schematic diagram illustrating an activation apparatus of a fuel cell stack according to an exemplary embodiment of the present inventive concept.

Referring to FIGS. 2A and 2B, the activation apparatus 1 according to the present disclosure may include a frame 7, a connector connecting unit 100, an output cable connecting unit 200, and a fluid supply pipe connecting unit 300.

In particular, the frame 7 may support various constituent elements that will be described below, and may include one frame or a frame divided into two or more sectors.

The frame 7 may include various elements such as a bracket, a bar, a rod, a plate, a housing, a case, a block, a partition wall, a rib, a rail, a collar, etc. for supporting the constituent elements.

However, since the various elements are used to install each of the constituent elements that will be described below in the frame 7, the various elements are included in the frame 7.

Furthermore, in the frame 7, a transferring apparatus may be installed to place the fuel cell stack 5 in which a plurality of unit cells are stacked into an activation work area or withdraw the fuel cell stack 5 from the activation work area.

The transferring apparatus may include a driving means (not shown) for providing forward and backward driving force to the fuel cell stack 5, and a first guide rail 8 for guiding the fuel cell stack 5 into the activation work area.

Further, a plurality of cell terminals 9 (commonly referred to as "SVM terminal" in the industry) that protrude from a plurality of unit cells may be formed on the fuel cell stack 5. For example, the cell terminals 9 may be continually arranged at a lower part of the fuel cell stack 5 while being spaced apart by a predetermined interval (see FIG. 3).

Figure 3:
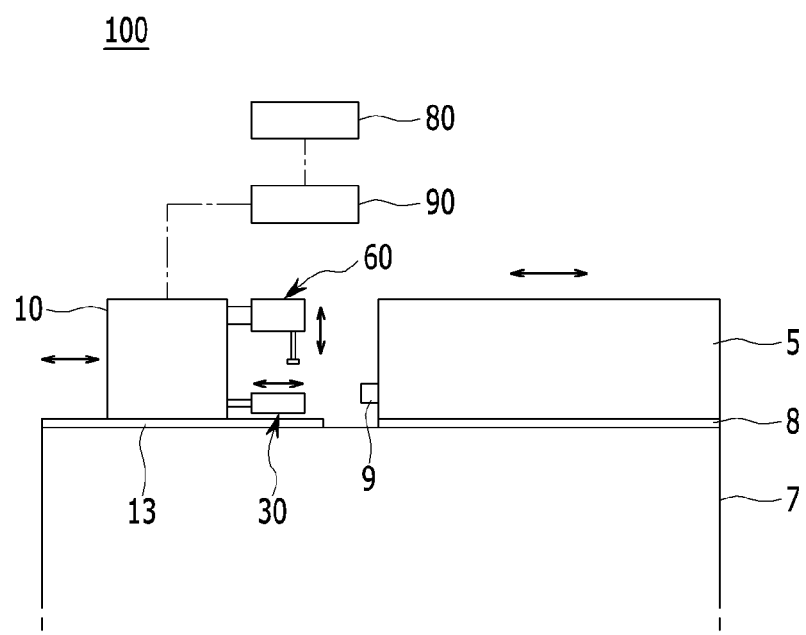
FIG. 3 is a block diagram schematically illustrating a connector connecting unit applied to an activation apparatus of a fuel cell stack according to an exemplary embodiment of the present inventive concept.

FIG. 3 is a block diagram schematically illustrating a connector connecting unit applied to an activation apparatus of a fuel cell stack according to an exemplary embodiment of the present inventive concept.

Referring to FIGS. 2A to 3, the connector connecting unit 100 may automatically connect a cell voltage measuring system 2 configured to measure the average cell voltage of the unit cells constructing the fuel cell stack 5 with the cell terminals 9 of the fuel cell stack 5.

The connector connecting unit 100 may include a first moving body 10, a terminal guide 30, and a connecting part 60.

In the present disclosure, the first moving body 10 may include the terminal guide 30 and the connecting part 60 that will be described below, and may reciprocate forward and backward with respect to the fuel cell stack 5.

The first moving body 10 may enable reciprocating movements in an entering direction (e.g., horizontal direction) of the fuel cell stack 5 on the frame 7 with respect to the cell terminals 9 of the fuel cell stack 5.

In other words, the first moving body 10, as a motor driven type, may reciprocate in the entering direction of the fuel cell stack 5 along the first guide rail 8.

Figure 4:
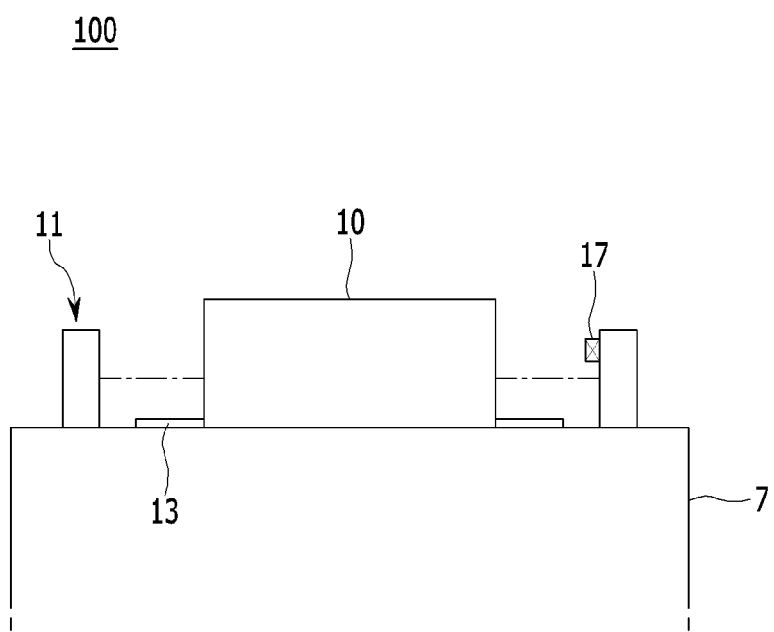
FIG. 4 is a diagram schematically illustrating an operation of a moving body of a connector connecting unit applied to an activation apparatus of a fuel cell stack according to an exemplary embodiment of the present inventive concept.

The first moving body 10 may move on the frame 7 back and forth in the entering direction of the fuel cell stack 5 by a first actuator 11 as shown in FIG. 4, and may be installed movably back and forth in the entering direction of the fuel cell stack 5 along a second guide rail 13 mounted on the frame 7.

The first actuator 11 may include a common cylinder apparatus configured to provide a forward and backward driving force of air pressure or hydraulic pressure to the first moving body 10, and may include a common transferring apparatus configured to transform a rotational force of a motor into a linear reciprocating motion through a lead screw and a linear motion (LM) guide.

Herein, a proximity sensor 17 configured to limit the transferring location of the first moving body 10 may be installed on the frame 7.

In particular, the proximity sensor 17 may be configured to limit a forward location of the first moving body 10 with respect to the fuel cell stack 5. When the first moving body 10 reaches a predetermined position, the proximity sensor 17 may detect the position and output a detection signal to a controller 90. The controller 90 may then stop the movement of the first moving body 10 by applying a control signal to the first actuator 11.

Referring to FIG. 3, in an exemplary embodiment of the present inventive concept, the terminal guide 30 may support the cell terminals 9 of the fuel cell stack 5 as mentioned above.

Figure 5:
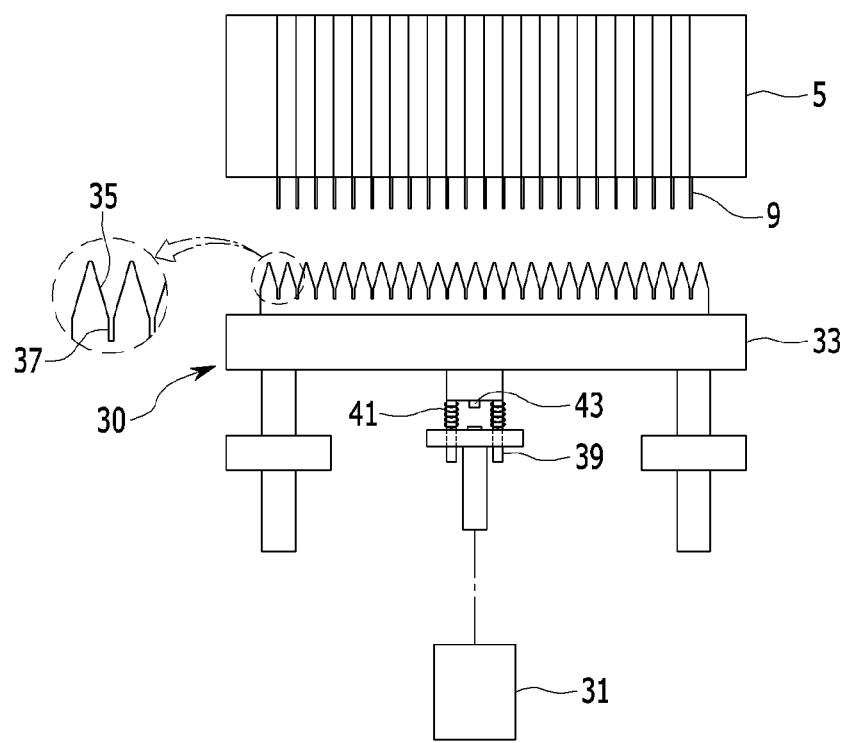
FIG. 5 is a diagram schematically illustrating a terminal guide of a connector connecting unit applied to an activation apparatus of a fuel cell stack according to an exemplary embodiment of the present inventive concept.

FIG. 5 is a diagram schematically illustrating a terminal guide of a connector connecting unit applied to an activation apparatus of a fuel cell stack according to an exemplary embodiment of the present invention.

Referring to FIG. 3 and FIG. 5, in an exemplary embodiment of the present inventive concept, the terminal guide 30 may reciprocate at the first moving body 10 with respect to the cell terminals 9 of the fuel cell stack 5.

The terminal guide 30 may include a guide block 33 moving back and forth in the horizontal direction (e.g., entering direction of the fuel cell stack) in the first moving body 10 through a second actuator 31.

In the above description, the second actuator 31 may include the cylinder apparatus configured to provide a forward and backward driving force of air pressure or hydraulic pressure to the guide block 33, and may include the transferring apparatus configured to transform a rotational force of a motor into a linear reciprocating motion through a lead screw and an LM guide.

On the guide block 33, "V"-shaped supporting grooves 35 may be formed to support the cell terminals 9 of the fuel cell stack 5. An inserting groove 37 into which the cell terminal 9 is inserted may be formed in the supporting grooves 35.

In other words, as the guide block 33 moves toward the cell terminals 9 of the fuel cell stack 5 by the second actuator 31, the cell terminals 9 may be guided to the supporting grooves 35 of the guide block 33 and inserted into the inserting groove 37.

Herein, the guide block 33 may be movably installed to a connecting end of the second actuator 31 through a first guide bar 39, and a shock absorbing spring 41 which absorbs supporting pressure of the guide block 33 against the cell terminals 9 between the guide block 33 and the connecting end of the second actuator 31 may be installed on the first guide bar 39.

A first rod cell 43 detects a contact with the connecting end of the second actuator 31 may be installed on the guide block 33. The first rod cell 43 may detect contact pressure between the connecting end of the second actuator 31 and the guide block 33, and output a detection signal to the controller 90.

In other words, when the guide block 33 moves toward the cell terminals 9 of the fuel cell stack 5 by the second actuator 31, the first rod cell 43 absorbs the supporting pressure of the guide block 33 against the cell terminals 9 through the shock absorbing spring 41. When the connecting end of the second actuator 31 contacts the guide block 33, the first rod cell 43 detects the contact and outputs the detection signal to the controller 90. Then, the controller 90 may terminate the operation of the second actuator 31 by applying a control signal to the second actuator 31.

Referring to FIG. 3, in the present disclosure, the connecting part 60 is connected to the cell terminals 9 of the fuel cell stack 5, and is commonly referred to as "CVM connector" in the industry.

Figure 6:
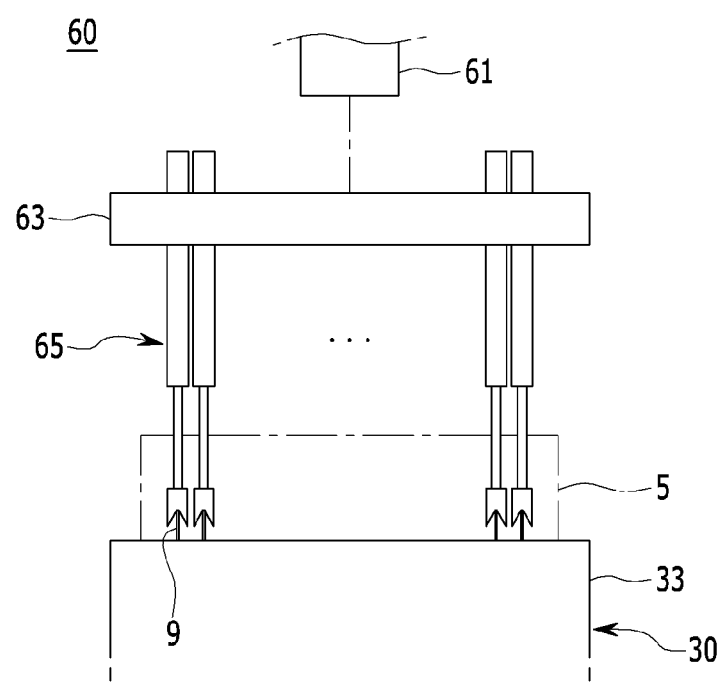
FIG. 6 is a diagram schematically illustrating a connecting part of a connector connecting unit applied to an activation apparatus of a fuel cell stack according to an exemplary embodiment of the present inventive concept.

FIG. 6 is a diagram schematically illustrating a connecting part of a connector connecting unit applied to an activation apparatus of a fuel cell stack according to an exemplary embodiment of the present inventive concept.

Referring to FIGS. 3 and 6, in the present disclosure, the connecting part 60 may include a probe block 63 installed in the first moving body 10 to reciprocate up and down movement (e.g., vertical movement) by a third actuator 61.

In other words, the probe block 63 may be transferred in a downward direction by the third actuator 61 while the cell terminals 9 of the fuel cell stack 5 are supported by the guide block 33 of the terminal guide 30.

The third actuator 61 may be installed in the first moving body 10. The third actuator 61 may include a common cylinder apparatus operated forward and backward by air pressure or hydraulic pressure, and reciprocates the probe block 63 up and down.

A plurality of connector probes 65 that contact the cell terminals 9 arranged to be supported by the guide block 33 are installed in the probe block 63.

The connector probes 65 may be successively arranged while spaced apart by a predetermined interval in the probe block 63 corresponding to the cell terminals 9 of the fuel cell stack 5. The connector probes 65 may be connected to the cell terminals 9 of the fuel cell stack 5 in a contact manner.

Figure 7:
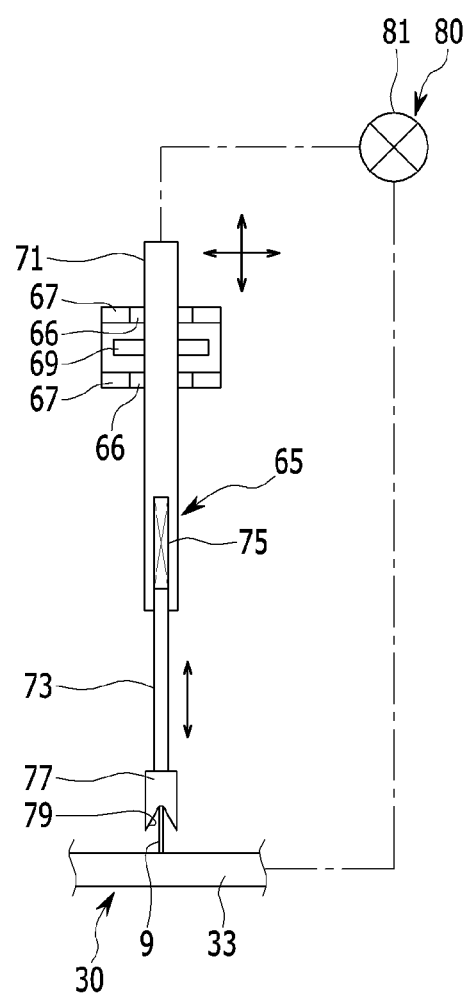
FIG. 7 is a diagram schematically illustrating a connector probe of a connecting part applied to an activation apparatus of a fuel cell stack according to an exemplary embodiment of the present inventive concept.

FIG. 7 is a diagram schematically illustrating a connector probe of a connecting part applied to an activation apparatus of a fuel cell stack according to an exemplary embodiment of the present inventive concept.

Referring to FIGS. 3, 6, and 7, in an exemplary embodiment of the present inventive concept, the connector probe 65 may be installed in the probe block 63 movably in up/down and left/right directions (e.g., in horizontal and vertical directions).

The probe block 63 may include a mounting hole 66 having a greater inner diameter than an outer diameter of the connector probe 65, and a pair of fixed plates 67 supporting the connector probe 65 through the mounting hole 66 may be installed in the probe block 63.

A ring member 69 may be fixed at the connector probe 65, and the ring member 69 may be disposed between the pair of fixed plates 67 at a predetermined distance from the fixed plates 67.

In other words, the connector probe 65 is supported by the mounting hole 66 of the fixed plate 67 with a greater inner diameter than the outer diameter thereof, and the ring member 69 is fixed between the pair of fixed plates 67. Accordingly, the connector probe 65 may be movably installed in the probe block 63 in up/down and left/right directions (based on the drawing).

Although position deviation occurs, such as when the connector probes 65 are vertically placed on the cell terminals 9 at a predetermined tolerance or the cell terminals 9 are non-uniformly arranged, the cell terminals 9 and the connector probes 65 can be accurately connected because the connector probes 65 are allowed to move in vertical and horizontal directions.

In the present disclosure, the connector probe 65 may include an outer shell member 71, a probe pin 73, a return spring 75, and a connector head 77.

The outer shell member 71 may be movably installed in the probe block 63 in vertical and horizontal directions. The probe pin 73 may be movably installed in the outer shell member 71 in a vertical direction while protruding outside of the outer shell member 71.

The return spring 75 provides a contact force for the cell terminals 9. The return spring 75 is installed within the outer shell member 71 and may apply elastic force to the probe pin 73.

The connector head 77 may substantially contact the cell terminals 9 of the fuel cell stack 5, and may be installed at an end (e.g., lower end based on the drawing) of the probe pin 73.

Herein, a "V"-shaped head groove 79 for guiding (or supporting) the cell terminals 9 of the fuel cell stack 5 is formed in the connector head 77.

In other words, since the "V"-shaped head groove 79 is formed in the connector head 77, the connector probes 65 may move vertically and horizontally with respect to the probe block 63.

Referring to FIGS. 3 and 7, the connector connecting unit 100 according to the present disclosure may further include a display unit 80 configured to display an electrical connection between the cell terminals 9 of the fuel cell stack 5 and the connector probes 65.

In the present disclosure, the display unit 80 may be electrically connected to the connector probes 65 and the guide block 33 of the terminal guide 30, and may include an light emitting diode (LED) bulb 81 emitting light by an electric signal.

The connector probes 65 and the guide block 33 may be made of conductive materials. When the connector probes 65 contact the cell terminals 9, electric power is applied to the LED bulb 81, and the LED bulb 81 may display the connection state between each of the connector probes 65 and the cell terminals 9 with light.

When the connector probes 65 and the cell terminals 9 do not properly contact or the unit battery is defective, the LED bulb 81 may not emit light since electric power is not applied thereto, and thus, a failure state of a corresponding cell may be displayed.

In an exemplary embodiment of the present inventive concept, as shown in FIGS. 2A-3, the controller 90 is included to execute the overall operation of the activation apparatus 1.

The controller 90 may receive the detection signal of the proximity sensor 17, and may control operation of the first actuator 11 to limit the position of the first moving body 10 with respect to the fuel cell stack 5.

In addition, as described above, when the connecting end of the second actuator 31 contacts the guide block 33, the controller 90 receives the detection signal from the first rod cell 43 and controls operation of the second actuator 2.

The controller 90 may move the probe block 63 in the vertical direction by controlling the third actuator 61, and may apply power to the LED bulb 81 of the display unit 80 when the connector probes 65 contact the cell terminals 9.

Referring to FIGS. 2A and 2B, in an exemplary embodiment of the present inventive concept, the output cable connecting unit 200 may automatically connect a positive (+) output cable 4a of the electric load system 4 to one side of the fuel cell stack 5 that moves toward the frame 7.

Figure 8A:
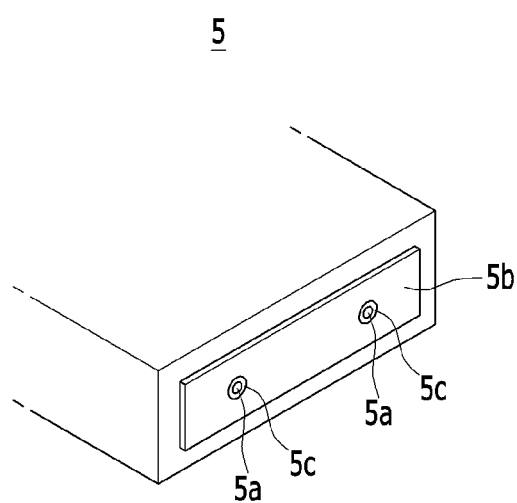
FIGS. 8A and 8B are diagrams schematically illustrating a fuel cell stack applied to an activation apparatus of a fuel cell stack according to an exemplary embodiment of the present inventive concept.

As shown in FIG. 8A, the output cable connecting unit 200 may automatically connect the positive (+) output cable 4a of the electric load system 4 to a positive (+) output terminal 5a disposed at one side of the fuel cell stack 5.

The positive (+) output terminal 5a is disposed at an end plate 5b disposed at one side of the fuel cell stack 5, and a terminal hole 5c is formed at the positive (+) output terminal 5a.

Figure 9A:
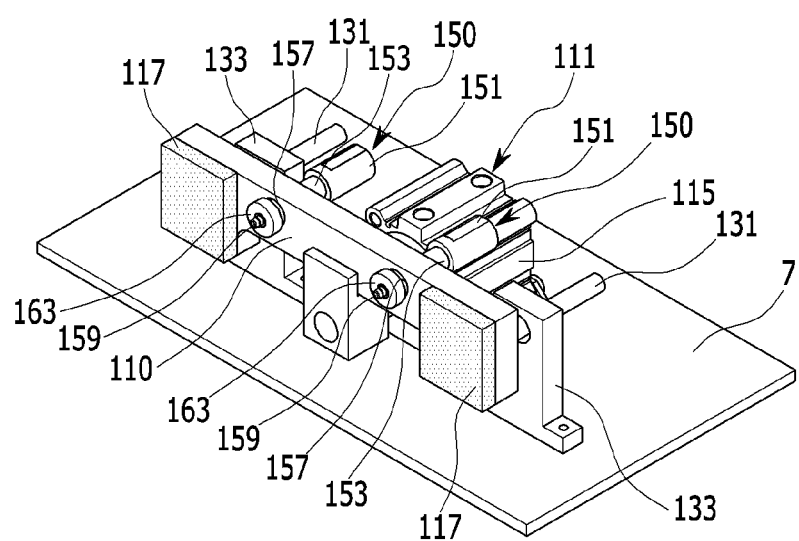
FIGS. 9A and 9B are diagrams illustrating an output cable connecting unit applied to an activation apparatus of a fuel cell stack according to an exemplary embodiment of the present inventive concept.
Figure 9B:
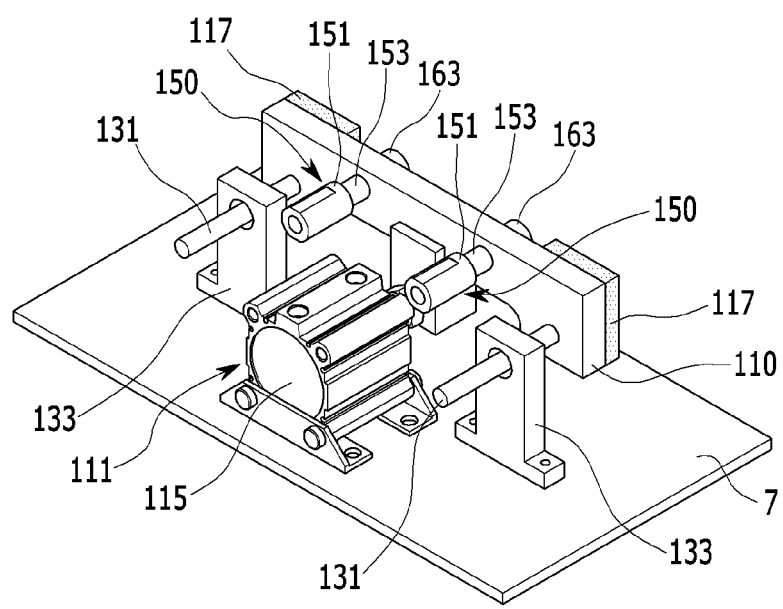

FIGS. 9A and 9B are diagrams illustrating an output cable connecting unit applied to an activation apparatus of a fuel cell stack according to an exemplary embodiment of the present inventive concept.

Referring to FIGS. 2A, 2B, 9A, and 9B, the output cable connecting unit 200 may include a second moving body 110 and a first connecting terminal set 150.

The second moving body 110 may reciprocate forward and backward with respect to the one side of the fuel cell stack 5.

The second moving body 110 may reciprocate on the frame 7 with respect to the positive (+) output terminal 5*a* (refer to FIG. 8A) of the end plate 5*b* (refer to FIG. 8B) disposed at the one side of the fuel stack 5, based on the fuel cell stack 5.

In other words, the second moving body 110, being of a motor driven type, may reciprocate with respect to the one side of the fuel cell stack 5 along the first guide rail 8.

The second moving body 110 moves back and forth with respect to the one side of the fuel cell stack 5 by a fourth actuator 111.

The fourth actuator 111 may include an operating cylinder 115 moving the second moving body 110 back and forth with respect to the one side of the fuel cell stack 5 by providing forward and backward driving forces to the second moving body 110. For example, the operating cylinder 115 may include an air pressure cylinder.

A pair of attachments 117 that support the one side of the fuel cell stack 5 may be installed on the second moving body 110. The attachments 117 may buffer the adhering force of the second moving body 110 when a front surface of the second moving body 110 contacts the one side of the fuel cell stack 5 by the forward driving of the fourth actuator 111.

The attachments 117 may have a block shape made of a rubber material, and may be fixedly installed at both front sides of the second moving body 110 that correspond to the one side of the fuel cell stack 5.

Figure 10:
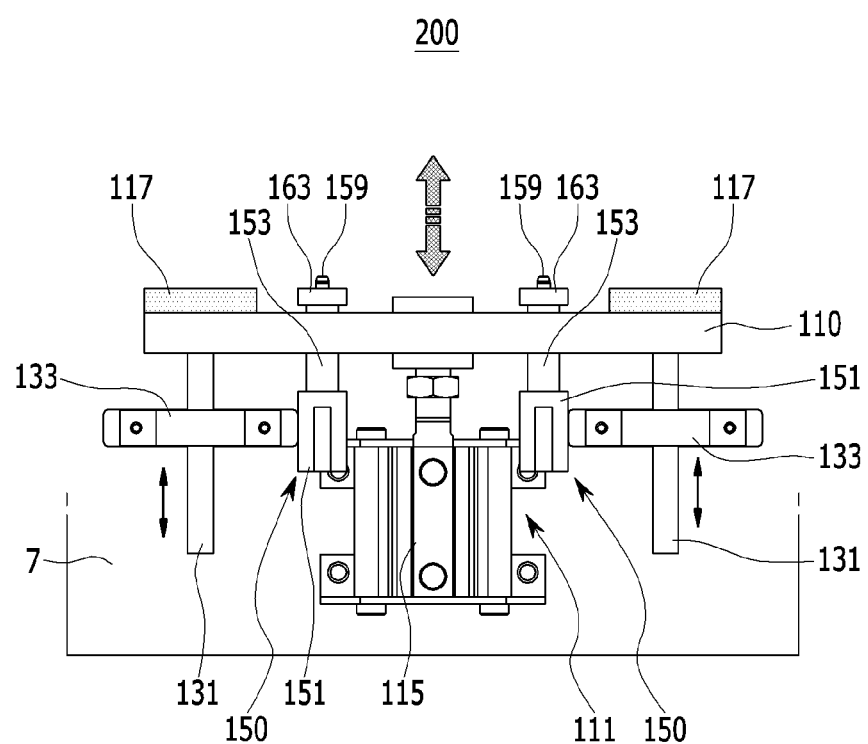
FIG. 10 is a diagram schematically illustrating an operation of a moving body of an output cable connecting unit applied to an activation apparatus of a fuel cell stack according to an exemplary embodiment of the present inventive concept.

Herein, since the second moving body 110 is connected to the operating cylinder 115 of the fourth actuator 111 as shown in FIGS. 9A-10, and moves back and forth with respect to the one side of the fuel cell stack 5, the second moving body 110 may be movably supported on the frame 7 back and forth via a second guide bar 131.

A pair of the second guide bars 131 may be connected to a rear surface of the second moving body 110, and may be inserted into a pair of first supporting blocks 133 fixed on the frame 7. The pair of the second guide bars 131 may guide a reciprocating motion of the second moving body 110.

Figure 11:
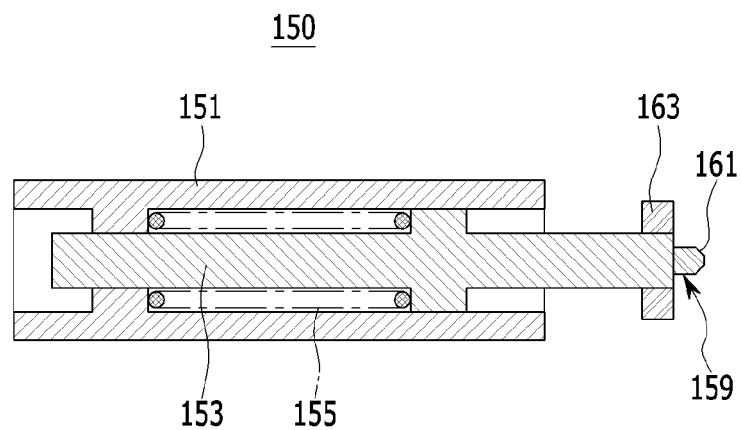
FIG. 11 is a diagram illustrating a first connecting terminal set of an output cable connecting unit applied to an activation apparatus of a fuel cell stack according to an exemplary embodiment of the present inventive concept.

FIG. 11 is a diagram illustrating a first connecting terminal set of an output cable connecting unit applied to an activation apparatus of a fuel cell stack according to an exemplary embodiment of the present inventive concept.

Referring to FIGS. 9A, 9B, and 11, in an exemplary embodiment of the present inventive concept, the first connecting terminal set 150 may be electrically connected to the positive (+) output terminal 5*a* by the second moving body 110 that moves toward the one side of the fuel cell stack 5.

The first connecting terminal set 150 may be elastically installed in the second moving body 110, and may be electrically connected to the positive (+) output terminal 5*a* of the end plate 5*b* disposed at the one side of the fuel cell stack 5.

The first connecting terminal set 150 may include a first cable connecting member 151 fixedly installed in the second moving body 110, a first terminal rod 153 installed in the first cable connecting member 151, and a first spring 155 installed between the first cable connecting member 151 and the first terminal rod 153.

The first cable connecting member 151 may have a cylinder shape, may be installed in the rear side of the second moving body 110, and may be connected to the electric load system 4 (refer to FIG. 2B) via the positive (+) output cable 4*a*.

The first terminal rod 153 may protrude from inside of the first cable connecting member 151 to the front side of the second moving body 110, and may be movably installed toward the one side of the fuel cell stack 5. In other words, the first terminal rod 153 may protrude from inside of the first cable connecting member 151 to the front side of the second moving body 110 through a penetration hole 157.

A first connecting terminal 159 electrically connected to the positive (+) output terminal 5*a* of the fuel cell stack 5 may be installed at the protruding end of the first terminal rod 153. The first connecting terminal 159 may be inserted into the terminal hole 5*c* of the positive (+) output terminal 5*a*. A tapered surface 161 is formed in the outer circumference surface of the first connecting terminal 159 so that the first connecting terminal 159 is easily inserted into the terminal hole 5*c* of the positive (+) output terminal 5*a*.

A first supporting member 163 having a disk shape that supports the positive (+) output terminal 5*a* of the fuel cell stack 5 may be installed at the protruded end of the first terminal rod 153. In other words, the first supporting member 163 may supports the positive (+) output terminal 5*a* of the end plate 5*b* when the first terminal rod 153 is inserted into the terminal hole 5*c* of the positive (+) output terminal 5*a*.

The first spring 155 may be installed between the first cable connecting member 151 and the first terminal rod 153. The first spring 155 supports the positive (+) output terminal 5*a* of the end plate 5*b* via the first supporting member 163, and applies elastic force to the first terminal rod 153 when the first terminal rod 153 is inserted into the terminal hole 5*c* of the positive (+) output terminal 5*a*.

In other words, the first terminal rod 153 may move in a rear direction of the second moving body 110 while overcoming the elastic force of the first spring 155, and apply the elastic force of the first spring 155 to the positive (+) output terminal 5*a* via the first connecting terminal 159.

Referring to FIGS. 2A and 2B, in an exemplary embodiment of the present inventive concept, the fluid supply pipe connecting unit 300 may automatically connect a negative (−) output cable 4*b* of the electric load system 4 to another side of the fuel cell stack 5, and to automatically connect a fluid supply pipe 6*a* of a fluid supply system 6 to the fuel cell stack 5.

Figure 8B:
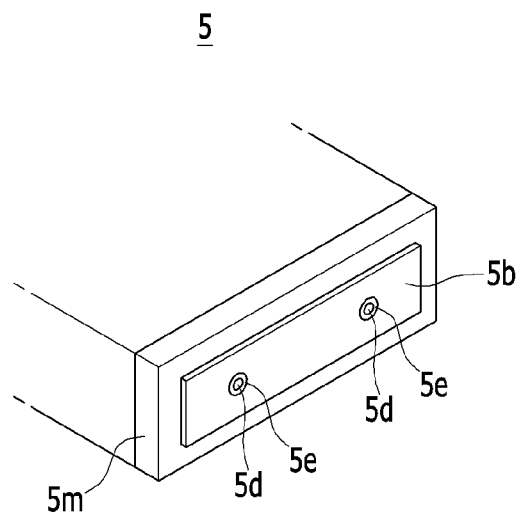

Particularly, as shown in FIG. 8B, the fluid supply pipe connecting unit 300 may automatically connect the negative (−) output cable 4*b* of the electric load system 4 to a negative (−) output terminal 5*d* disposed at the other side of the fuel cell stack 5.

The negative (−) output terminal 5*d* is disposed at an end plate 5*b* disposed at the other side of the fuel cell stack 5, and a terminal hole 5*e* is formed at the negative (−) output terminal 5*d*.

A manifold 5*m* supplies and exhausts hydrogen, air, and a coolant supplied through the fluid supply pipe 6*a* of the fluid supply system 6.

Figure 12A:
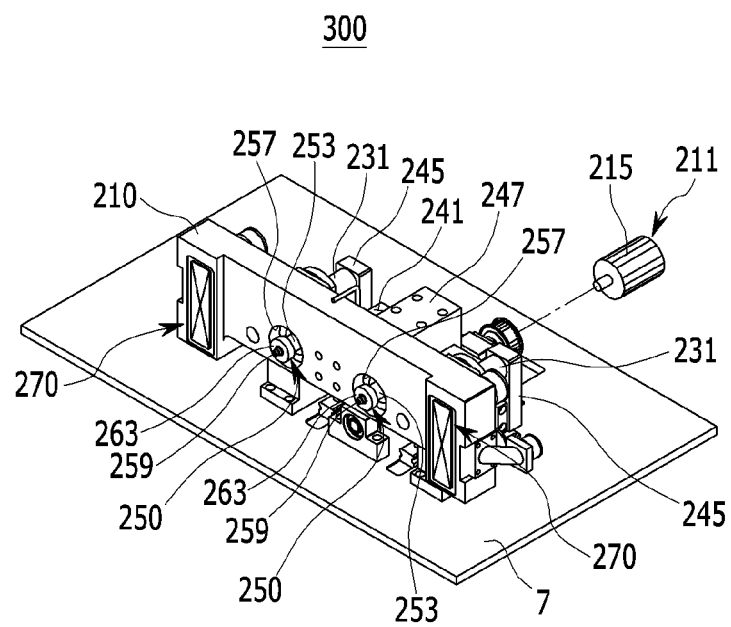
FIGS. 12A and 12B are diagrams illustrating a fluid supply pipe connecting unit applied to an activation apparatus of a fuel cell stack according to an exemplary embodiment of the present inventive concept.
Figure 12B:
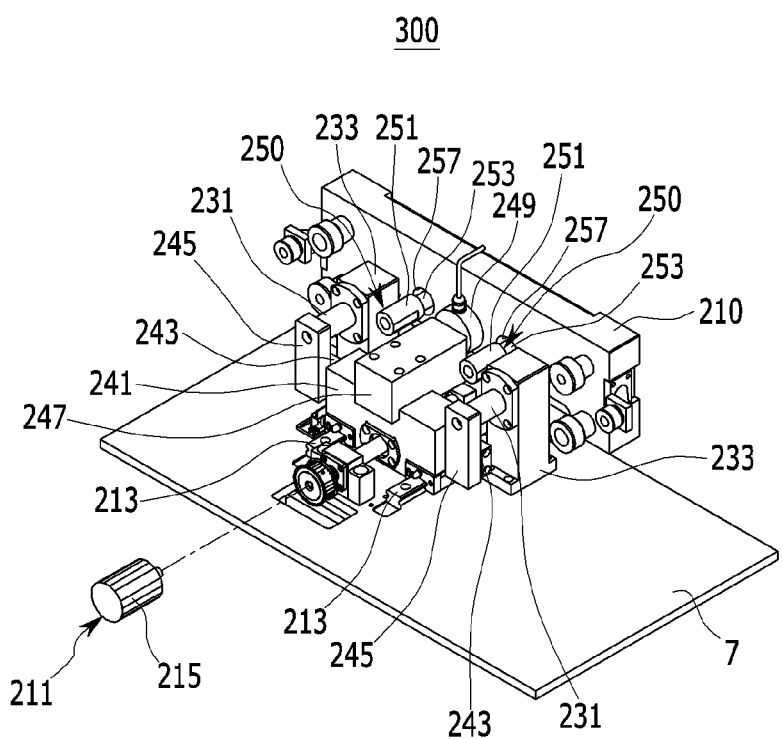

FIGS. 12A and 12B are diagrams illustrating a fluid supply pipe connecting unit applied to an activation apparatus of a fuel cell stack according to an exemplary embodiment of the present inventive concept.

Referring to FIGS. 2A, 2B, 12A, and 12B, the fluid supply pipe connecting unit 300 may include a third moving body 210 and a second connecting terminal set 250.

The third moving body 210 may reciprocate forward and backward with respect to the other side of the fuel cell stack 5.

The third moving body 210 may reciprocate on the frame 7 with respect to the negative (−) output terminal 5*b* (refer to FIG. 8B) of the end plate 5*b* (refer to FIG. 8B) disposed at the other side of the fuel cell stack 5, based on the fuel cell stack 5 that enters onto the frame 7.

In other words, the third moving body 210, a motor driven type, may reciprocate with respect to the other side of the fuel cell stack 5 along the first guide rail 8.

The third moving body 210 is installed movably back and forth with respect to the other side of the fuel cell stack 5 by a fifth actuator 211. The third moving body 210 may be installed movably back and forth via a third guide rail 213 on the frame 7.

The fifth actuator 211 may include a common transferring apparatus configured to transform rotational force of a motor into a linear reciprocation motion through a lead screw and an LM guide.

Figure 13:
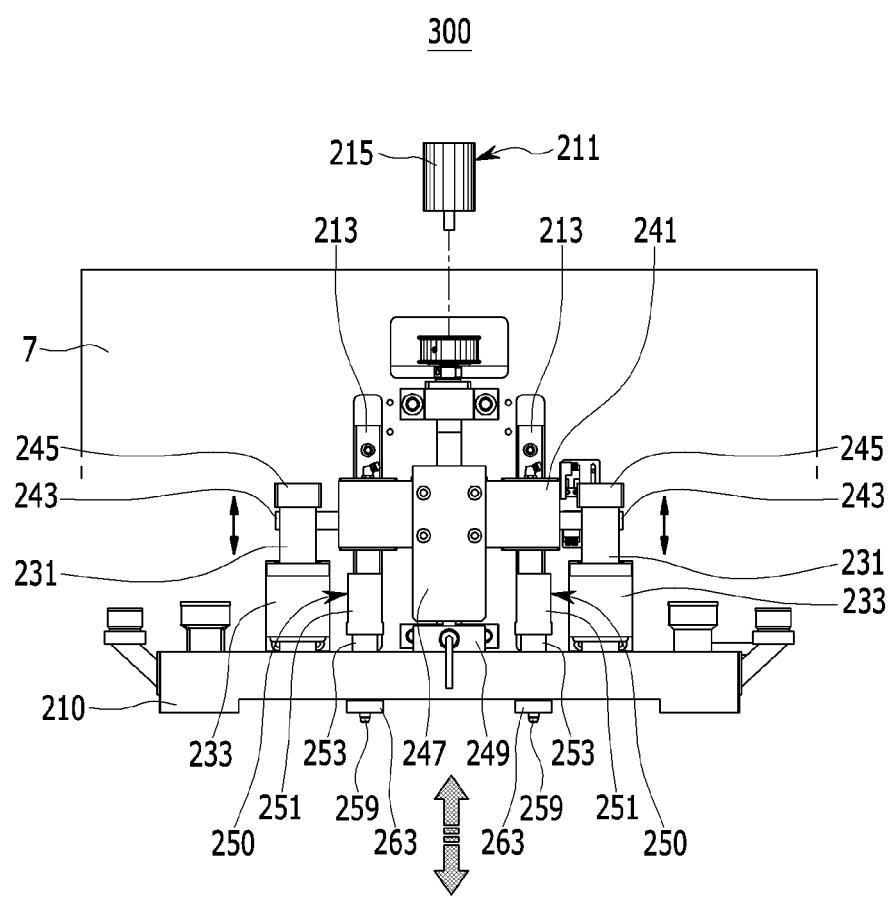
FIG. 13 is a diagram illustrating an operation of a moving body of a fluid supply pipe connecting unit applied to an activation apparatus of a fuel cell stack according to an exemplary embodiment of the present inventive concept.

As shown in FIGS. 12A-13, the third moving body 210 may move on the frame 7 back and forth with respect to the other side of the fuel cell stack 5 via a third guide bar 231. A pair of the third guide bars 231 may be connected to a rear surface of the third moving body 210, and may be inserted into a pair of second supporting blocks 233 which are fixed on the frame 7. The pair of the third guide bars 231 may guide a reciprocating motion of the third moving body 210.

A moving block 241, which moves back and forth with respect to the other side of the fuel cell stack 5 by the fifth actuator 211, may be installed on the frame 7 that corresponds to the rear surface of the third moving body 210. The moving block 241 may be coupled to the third guide rail 213 to allow sliding motion with respect to the other side of the fuel cell stack 5.

A stopper 243 may protrude at both sides of the moving block 241. In addition, a stopping block 245 engaged with the stopper 243 and corresponding to the stopper 243 may be installed at an end of the third guide bar 231.

Accordingly, when the moving block 241 reverses from the other side of the fuel cell stack 5 by the fifth actuator 211, the stopper 243 may be engaged with the stopping block 245.

A fixed block 247 that faces a rear side of the third moving body 210 may be fixedly installed on the moving block 241. When the moving block 241 moves to the other side of the fuel cell stack 5 by the fifth actuator 211, the fixed block 247 supports the rear surface of the third moving body 210.

In other words, when the moving block 241 moves to the other side of the fuel cell stack 5 by the fifth actuator 211, the fixed block 247 may push the third moving body 210.

Corresponding to the fixed block 247, a second rod cell 249, which is in contact with the fixed block 247, may be installed in the rear side of the third moving body 210. The second rod cell 249 may detect a contact pressure between the third moving block 210 and the fixed block 247, and output a detection signal to the controller 90 (refer to FIG. 2B).

In other words, when a front surface of the third moving body 210 contacts the other side of the fuel cell stack 5 via the fixed block 247 while moving the moving block 241 forward by the fifth actuator 211, the second rod cell 249 detects the contact pressure between the third moving body 210 and the fixed block 247, and output the detection signal to the controller 90.

The controller 90 may compare the contact pressure with a predetermined reference pressure. When the contact pressure is greater than the predetermined reference pressure, the controller 90 may terminate the operation of the fifth actuator 211 by applying a control signal to the fifth actuator 211.

Figure 14:
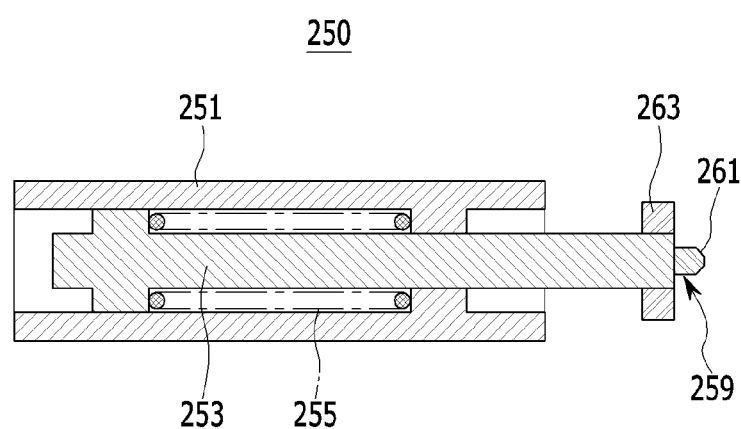
FIG. 14 is a diagram illustrating a second connecting terminal set of a fluid supply pipe connecting unit applied to an activation apparatus of a fuel cell stack according to an exemplary embodiment of the present inventive concept.

FIG. 14 is a diagram illustrating a second connecting terminal set of a fluid supply pipe connecting unit applied to an activation apparatus of a fuel cell stack according to an exemplary embodiment of the present inventive concept.

Referring to FIGS. 12A, 12B, and 14, the second connecting terminal set 250 may be electrically connected to the negative (−) output terminal 5d of the fuel cell stack 5 by the third moving body 210 that moves toward the other side of the fuel cell stack 5, and thus the negative (−) output cable 4b of the electric load system 4 (refer to FIG. 2B) may be connected to the negative (−) output terminal 5d of the fuel cell stack 5.

The second connecting terminal set 250 may be elastically installed in the third moving body 210, and may be electrically connected to the negative (−) output terminal 5d of the end plate 5b disposed at the other side of the fuel cell stack 5.

The second connecting terminal set 250 may include a second cable connecting member 251 fixedly installed in the third moving body 210, a second terminal rod 253 installed in the second cable connecting member 251, and a second spring 255 installed between the second cable connecting member 251 and the second terminal rod 253.

The second cable connecting member 251 may have a cylinder shape, may be installed in the rear side of the third moving body 210, and may be connected to the electric load system 4 (refer to FIG. 2B) via the negative (−) output cable 4b.

The second terminal rod 253 may protrude from inside the second cable connecting member 251 to the front side of the third moving body 210, and may move toward the other side of the fuel cell stack 5. In other words, the second terminal rod 253 may protrude from inside of the second cable connecting member 251 to the front side of the third moving body 210 through a penetration hole 257.

A second connecting terminal 259, which is electrically connected to the negative (−) output terminal 5d of the fuel cell stack 5, may be installed at the protruding end of the second terminal rod 253. The second connecting terminal 259 may be inserted into the terminal hole 5e of the negative (−) output terminal 5d. A tapered surface 261 is formed in an outer circumference surface of the second connecting terminal 259 so that the second connecting terminal 259 is easily inserted into the terminal hole 5e of the negative (−) output terminal 5d.

A second supporting member 263 having a disk shape that supports the negative (−) output terminal 5d of the fuel cell stack 5 may be installed at the protruded end of the second terminal rod 253. In other words, the second supporting member 263 may supports the negative (−) output terminal 5d of the end plate 5b when the second terminal rod 253 is inserted into the terminal hole 5e of the negative (−) output terminal 5d.

The second spring 255 may be installed between the second cable connecting member 251 and the second terminal rod 253. The second spring 255 supports the negative (−) output terminal 5d of the end plate 5b via the second supporting member 263, and applies elastic force to the second terminal rod 253 when the second terminal rod 253 is inserted into the terminal hole 5e of the negative (−) output terminal 5d.

In other words, the second terminal rod 253 may move in a rear direction of the third moving body 210 while overcoming the elastic force of the second spring 255, and may apply the elastic force of the second spring 255 to the negative (−) output terminal 5d via the second connecting terminal 259.

Referring FIGS. 2A, 2B, and 12, the fluid supply pipe connecting unit 300 may further include a plurality of pipe connecting parts 270 connected to the fluid supply pipe 6a of the fluid supply system 6.

Each of the pipe connecting parts 270 may be connected to the manifold 5m (refer to FIG. 8B) of the fuel cell stack 5, and may be fluid supply/exhaust holes for supplying and exhausting hydrogen, air, and coolant to and from the manifold 5m of the fuel cell stack 5.

Figure 15:
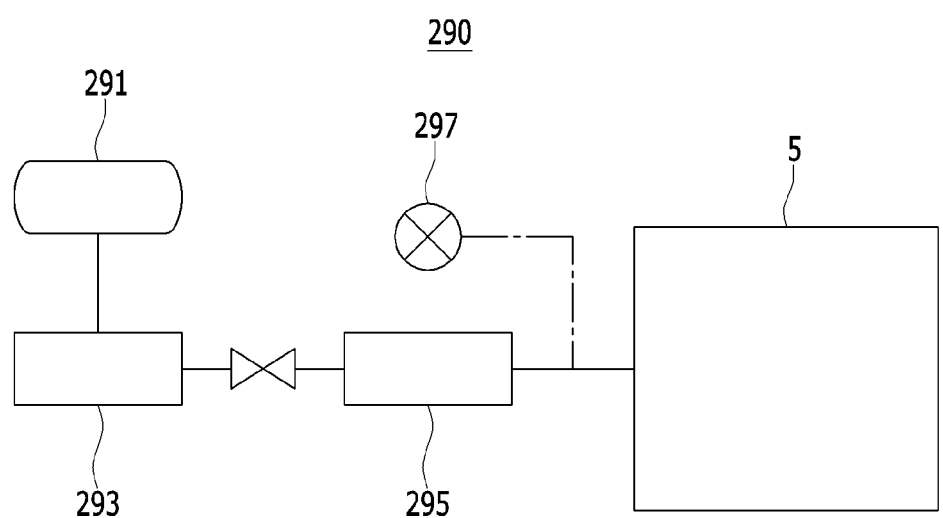
FIG. 15 is a diagram schematically illustrating an air-tightness testing part of a fluid supply pipe connecting unit applied to an activation apparatus of a fuel cell stack according to an exemplary embodiment of the present inventive concept.

In addition, the fluid supply pipe connecting unit 300 according to the present disclosure, as shown in FIG. 15, may further include an air-tightness testing unit 290 for testing the air-tightness of the fuel cell stack 5.

The air-tightness testing unit 290 may connect the fluid supply pipe 6a of the fluid supply system 6 to the manifold 5m of the fuel cell stack 5 via the pipe connecting part 270. The air-tightness testing unit 290 may test the air-tightness of the fuel cell stack 5 by injecting air into the fuel cell stack 5 via the pipe connecting part 270.

The air-tightness testing unit 290 may include an air supply source 291 supplying air to the pipe connecting part 270, an air pressure regulator 293 regulating the air pressure supplied to the pipe connecting part 270, a flow meter 295 measuring the flow rate of the supplied air, and a pressure sensor 297 detecting the air pressure exerted to the inside of the fuel cell stack 5.

Accordingly, in the present disclosure, the fluid supply holes of the pipe connecting part 270 may be opened, and the air supplied from the air supply source 291 may be injected into the fluid supply holes of the pipe connecting part 270 while the fluid exhaust holes may remain closed.

The air pressure supplied from the air supply source 291 may be regulated to a predetermined pressure using the air pressure regulator 293, and the flow rate of the supplied air may be measured by the flow meter 295 and may be regulated to a predetermined flow rate based on the measured value.

The pressure sensor 297 detects the air pressure exerted to the inside of the fuel cell stack 5, and output a detection signal to the controller 90 (refer to FIG. 2B). Accordingly, the controller 90 may determine whether the air-tightness of the fuel cell stack 5 is normal by comparing the detected air pressure based on the detection signal with a predetermined air pressure.

In addition, as shown in FIG. 2B, the activation apparatus 1 of the fuel cell stack according to the present disclosure may further include a display device 400 displaying whether the fuel cell stack 5 is normal based on a control signal of the controller 90.

For example, the controller 90 may compare an average cell voltage of the fuel cell stack 5 measured by the cell voltage measuring system 2 with a reference voltage, and display whether the fuel cell stack 5 is normal using the display device 400.

Hereinafter, the operation of the activation apparatus of the fuel cell stack according to an exemplary embodiment of the present inventive concept will be described with reference to the drawings.

In the present disclosure, the fuel cell stack 5 in which the plurality of unit cells are stacked may be transferred through the carrier 3, and the visual inspection may be performed. The visually inspected fuel cell stack 5 may be transferred to the activation apparatus 1 disposed with two channels through the moving path 1a.

The fuel cell stack 5 moves toward the frame 7, that is, may enter into a predetermined activation work area along the first guide rail 8.

When the fuel cell stack 5 enters into the activation work area, the connector connecting unit 100 automatically connects the cell voltage measuring system 2 with the cell terminals 9 of the fuel cell stack 5.

In particular, the first moving body 10 is transferred forward in the entering direction of the fuel cell stack 5 by the first actuator 11.

The first moving body 10 moves forward to the entry side of the fuel cell stack 5 along the second guide rail 13, and when the first moving body 10 reaches a predetermined position, the proximity sensor 17 detects the position and output the detection signal to the controller 90. The controller 90 may then stop the movement of the first moving body 10 by applying the control signal to the first actuator 11.

In the above state, the guide block 33 of the terminal guide 30 may move toward the cell terminals 9 of the fuel cell stack 5 by the second actuator 31.

While the guide block 33 moves toward the cell terminals 9 of the fuel cell stack 5 by the second actuator 31, the cell terminals 9 may be guided to the "V"-shaped supporting grooves 35 of the guide block 33 and may be inserted into the inserting groove 37.

When the guide block 33 moves toward the cell terminals 9 of the fuel cell stack 5 by the second actuator 31, a supporting pressure of the guide block 33 against the cell terminals 9 may be absorbed by the shock absorbing spring 41.

Further, when the guide block 33 contacts the connecting end of the second actuator 31 while continuously moving by overcoming the elastic force of the shock absorbing spring 41, the first rod cell 43 detects the contact and outputs the detection signal to the controller 90. Then, the controller 90 may terminate the operation of the second actuator 31 by applying the control signal to the second actuator 31.

The probe block 63 of the connecting part 60 may be transferred downwardly by the third actuator 61 while the cell terminals 9 of the fuel cell stack 5 are supported by the guide block 33.

Then, the plurality of connector probes 65 installed in the probe block 63 may contact the cell terminals 9 arranged to be supported by the guide block 33. The connector probes 65 may be connected to the cell terminals 9 via the connector head 77 installed at the end of the probe pin 73.

Since the connector probe 65 is supported by the mounting hole 66 of the fixed plate 67 with the greater inner diameter than the outer diameter of the connector probe 65, and the ring member 69 is fixed between the pair of the fixed plates 67, the connector probe 65 may be allowed to move in vertical and horizontal directions with respect to the probe block 63.

Accordingly, although position deviation occurs, for example, when the connector probes 65 are vertically placed on the cell terminals 9 at a predetermined tolerance or the cell terminals 9 are non-uniformly arranged, the cell terminals 9 and the connector probes 65 can be accurately connected.

In addition, since the connector probes 65 elastically support the probe pin 73 through the return spring 75 inside of the outer shell member 71, the contact force of the connector head 77 for the cell terminals 9 may increase.

Further, since the "V"-shaped head groove 79 is formed in the connector head 77, the connector probes 65 may be allowed to move vertically and horizontally with respect to the probe block 63 while supporting the cell terminals 9 via the head groove 79.

During such a process of the present disclosure, the output cable connecting unit 20 may automatically connect the positive (+) output cable 4a of the electric load system 4 to the positive (+) output terminal 5a disposed at one side of the fuel cell stack 5.

In particular, the second moving body 110 may move toward the one side of the fuel cell stack 5 by the fourth actuator 111.

The second moving body 110 may be guided via the second guide bar 131 inserted into the first supporting block 133 and may move toward the one side of the fuel cell stack 5.

Then, the attachment 117 may support the one side of the fuel cell stack 5. Accordingly, the attachment 117 may buffer the adhering force of the second moving body 110 with respect to the one side of the fuel cell stack 5.

As described above, when the front surface of the second moving body 110 contacts the one side of the fuel cell stack 5, the positive (+) output terminal 5a is supported by the first supporting member 163, and the first terminal rod 153 of the first connecting terminal set 150 may move in the rear direction of the second moving body 110 while overcoming the elastic force of the first spring 155.

Since the tapered surface 161 is formed in the outer circumference surface of the first connecting terminal 159, the first connecting terminal 159 installed at the protruded end of the first terminal rod 153 is easily inserted into the terminal hole 5c of the positive (+) output terminal 5a.

In addition, since the elastic force of the first spring 155 is exerted to the first terminal rod 153, the first connecting terminal 159 may be inserted into the terminal hole 5c with improved adhering force and may come into surface contact with the terminal hole 5c.

According to the present disclosure, the fluid supply pipe connecting unit 300 may automatically connect the negative (−) output cable 4b of the electric load system 4 to the negative (−) output terminal 5d disposed at another side of the fuel cell stack 5, and may automatically connect the fluid supply pipe 6a of the fluid supply system 6 to the manifold 5m of the fuel cell stack 5.

In particular, the moving block 241 is transferred toward the other side of the fuel cell stack 5 along the third guide rail 213 by the fifth actuator 211.

Then, the fixed block 247 fixed on the moving block 241 contacts the second rod cell 249, and pushes and moves the third moving body 210 toward the other side of the fuel cell stack 5.

The third moving body 210 may be guided toward the other side of the fuel cell stack 5 via the third guide bar 231 inserted into the second supporting block 233.

When the third moving body 210 moves backward from the other side of the fuel cell stack 5, the moving block 241 moves backward from the other side of the fuel cell stack 5 by the fifth actuator 211. The third moving body 210 may move backward while the stopper 243 of the moving block 241 is engaged with the stopping block 245 of the third guide bar 231.

When a front surface of the third moving body 210 contacts the other side of the fuel cell stack 5, the fixed block 247 may press the second rod cell 249.

Then, the second rod cell 249 detects a contact pressure between the third moving body 210 and the fixed block 247, and output the detection signal to the controller 90.

When the contact pressure is greater than a reference pressure, the controller 90 may terminate the operation of the fifth actuator 211 by applying the control signal to the fifth actuator 211.

As described above, when the front surface of the third moving body 210 contacts the other side of the fuel cell stack 5, the negative (−) output terminal 5d is supported by the second supporting member 263, and the second terminal rod 253 of the second connecting terminal set 250 may move in a rear direction of the third moving body 210 while overcoming the elastic force of the second spring 255.

Since the tapered surface 261 is formed in the outer circumference surface of the second connecting terminal 259, the second connecting terminal 259 installed at the protruding end of the second terminal rod 253 is easily inserted into the terminal hole 5e of the negative (−) output terminal 5d.

In addition, since the elastic force of the second spring 255 is exerted to the second terminal rod 253, the second connecting terminal 259 may be inserted into the terminal hole 5e with improved adhering force and may come into surface contact with the terminal hole 5e.

When the second connecting terminal 259 of the second connecting terminal set 250 is connected to the negative (−) output terminal 5d of the fuel cell stack 5, the pipe connecting part 270 may be connected to the manifold 5m of the fuel cell stack 5.

After the fluid supply pipe 6a of the fluid supply system 6 is connected to the manifold 5m of the fuel cell stack 5 via the pipe connecting part 270, the air supplied from the air supply source 291 of the air-tightness testing unit may be injected into the fluid supply holes of the pipe connecting part 270.

The air pressure supplied from the air supply source 291 may be regulated to a predetermined pressure using the air pressure regulator 293, and the flow rate of the supplied air may be measured by the flow meter 295 and may be regulated to a predetermined flow rate based on the measured value.

The pressure sensor 297 of the air-tightness testing unit 290 detects the air pressure exerted to the inside of the fuel cell stack 5, and output the detection signal to the controller 90. The controller 90 may determine whether the air-tightness of the fuel cell stack 5 is normal by comparing the detected air pressure based on the detection signal with the predetermined air pressure.

According to the present disclosure, the connector connecting unit 100 may automatically connect the cell voltage measuring system 2 for measuring the average cell voltage of the fuel cell stack 5 with the cell terminals 9 of the fuel cell stack 5.

The positive (+) output cable 4a of the electric load system 4 may be automatically connected to the positive (+) output terminal 5a disposed at the one side of the fuel cell stack 5 by the output cable connecting unit 200.

According to the present disclosure, the negative (−) output cable 4b of the electric load system 4 may be automatically connected to the negative (−) output terminal 5d disposed at the other side of the fuel cell stack 5 by the fluid supply pipe connecting unit 300, and fluid supply pipe 6a of the fluid supply system 6 may be automatically connected to the manifold 5m of the fuel cell stack 5.

In such a state, hydrogen, air, and coolant supplied through the fluid supply pipe 6a of the fluid supply system 6 may be supplied to the fuel cell stack 5 through the pipe connecting part 270 of the fluid supply pipe connecting unit 300.

Then, the electrical energy may be generated in the fuel cell stack 5 through the electro-chemical reaction between hydrogen and air. The electrical energy may be applied to the electric load system 4 through the positive (+) output terminal 5a and the positive (+) output cable 4a electrically connected by the output cable connecting unit 200, and the negative (−) output terminal 5d and the negative (−) output cable 4b electrically connected by the fluid supply pipe connecting unit 300.

During the process of applying the electricity generated from the fuel cell stack 5 to the electric load system 4, the display unit 80 may display the electrical connection between the connector probes 65 of the connector connecting unit 100 and the cell terminals 9 of the fuel cell stack 5.

In other words, by electrically connecting the connector probes 65, the guide block 33, and the display unit 80, when the connector probes 65 contact the cell terminals 9, electric power is applied to the LED bulb 81 of the display unit 80, and the LED bulb 81 may be emit light.

When the connector probes 65 and the cell terminals 9 do not properly contact or the unit battery is defective, the LED bulb 81 may not emit light since electric power is not applied thereto, and thus, the failure state of a corresponding cell may be displayed.

Accordingly, the connection between the connector probes 65 and each cell terminal 9 may be displayed by light emitted from the LED bulb 81 of the display unit 80.

In an exemplary embodiment of the present invention, since the cell voltage measuring system 2 and the cell terminals 9 of the fuel cell stack 5 are connected via the connector connecting unit 100, the average cell voltage of the fuel cell stack 5 may be measured by the cell voltage measuring system 2.

The average cell voltage measured by the cell voltage measuring system 2 is transmitted to the controller 90, and the controller 90 may display whether the fuel cell stack 5 is normal using the display device 400 by comparing the average cell voltage and the reference voltage.

The activation apparatus 1 of a fuel cell stack according to an exemplary embodiment of the present inventive concept enables the activation process and performance evaluation of the fuel cell stack 5 to be unmanned and automated by the connector connecting unit 100, the output cable connecting unit 200, and the fluid supply pipe connecting unit 300 in the multiple channel manner.

In addition, since the voltage measuring connector, the output cable, and the fluid supply pipe may be simultaneously connected in the automated process, the activation apparatus 1 may more flexibly respond to the process of mass production of automatic assembly of fuel cell vehicles.

Furthermore, since the voltage measuring connector, the output cable, and the fluid supply pipe may be simultaneously connected in the automated process, workability in the activation process of the fuel cell stack may be improved, damage to the fuel cell stack and an electric shock accident of a worker may be prevented, and the air-tightness of the fuel cell stack may be secured while supplying a fluid.

While this invention has been described in connection with what is presently considered to be practical exemplary embodiments, it is to be understood that the invention is not limited to the disclosed embodiments, but on the contrary, is intended to cover various modifications and equivalent arrangements included within the spirit and scope of the appended claims.

What is claimed is:

1. An activation apparatus of a fuel cell stack for performing activation and performance evaluation on the fuel cell stack when the fuel cell stack moves toward a frame, the activation apparatus comprising:
   an output cable connecting unit mounted on the frame and connecting a positive output cable of an electric load system to a positive output terminal on a first side of the fuel cell stack; and
   a fluid supply pipe connecting unit mounted on the frame to reciprocate forward and backward with respect to a second side of the fuel cell stack, the fluid supply pipe connecting unit connecting a negative output cable of the electric load system to a negative output terminal on the second side of the fuel cell stack and connecting a fluid supply pipe of a fluid supply system to a manifold of the fuel cell stack,
   wherein the fluid supply pipe connecting unit includes:
   a first moving body reciprocating forward and backward with respect to the second side of the fuel cell stack by an actuator,
   a connecting terminal set elastically installed in the first moving body and connected to the negative output terminal of the fuel cell stack, and
   a pipe connecting part mounted to the first moving body and connected to the fluid supply pipe.

2. The activation apparatus of claim 1, wherein the connecting terminal set includes:
   a cable connecting member fixedly installed in the first moving body and connected to the electric load system via the negative output cable;
   a terminal rod protruding outwardly from inside the cable connecting member and moving toward the second side of the fuel cell stack, wherein a connecting terminal is installed at a protruding end of the terminal rod; and
   a spring installed between the cable connecting member and the terminal rod and applying elastic force to the terminal rod.

3. The activation apparatus of claim 2, wherein the connecting terminal is inserted into a terminal hole formed at the second side of the fuel cell stack, and has a tapered outer circumference.

4. The activation apparatus of claim 3, wherein the connecting terminal set further includes a supporting member, which has a disk shape and supports the negative output terminal of the fuel cell stack, installed at the protruding end of the terminal rod.

5. The activation apparatus of claim 1, wherein the first moving body moves back and forth with respect to the second side of the fuel cell stack by a pair of guide bars.

6. The activation apparatus of claim 5, wherein the pair of guide bars are inserted into a pair of supporting blocks which are fixed on the frame.

7. The activation apparatus of claim 5, wherein the fluid supply pipe connecting unit further includes a moving block moving back and forth on the frame with respect to the second side of the fuel cell stack by the actuator.

8. The activation apparatus of claim 7, wherein the moving block includes stoppers protruding at both sides of the moving block.

9. The activation apparatus of claim 8, wherein the pair of guide bars include a stopping block mounted at an end thereof and engaged with the stopper.

10. The activation apparatus of claim 7, wherein the moving block includes a fixed block fixedly installed thereon.

11. The activation apparatus of claim 10, wherein the moving block further includes a rod cell which is in contact with the fixed block.

12. The activation apparatus of claim 1, wherein the fluid supply pipe connecting unit further includes an air-tightness tester for testing air-tightness of the fuel cell stack.

13. The activation apparatus of claim 12, wherein the air-tightness tester includes:
   an air supply source configured to supply air to the pipe connecting part;
   an air pressure regulator configured to regulate air pressure that is supplied to the pipe connecting part;

a flow meter configured to measure flow rate of the supplied air; and a pressure sensor configured to detect the air pressure exerted to inside of the fuel cell stack.

14. The activation apparatus of claim 1, further comprising:
a connector connecting unit automatically connecting a cell voltage measuring system with cell terminals of the fuel cell stack,
wherein the connector connecting unit includes:
a second moving body reciprocating moving the fuel cell stack in a horizontal direction with respect to the cell terminals;
terminal guide reciprocating at the second moving body with respect to the cell terminals; and
a connecting part connected to the cell terminals and including a probe block to reciprocate in an up and down movement.

15. The activation apparatus of claim 14, a proximity sensor detects a position of the second moving body and sends a control signal to a controller to limit the movement of the second moving body.

16. The activation apparatus of claim 11, wherein the rod cell detects a contact pressure between another moving body and the fixed block, and outputs a detection signal to a controller.

17. The activation apparatus of claim 1, further comprising a display displaying whether the fuel cell stack is normal based on a control signal of a controller.

18. An activation apparatus of a fuel cell stack for performing activation and performance evaluation on the fuel cell stack when the fuel cell stack moves toward a frame, the activation apparatus comprising:
an output cable connecting unit mounted on the frame and connecting a positive output cable of an electric load system to a positive output terminal on a first side of the fuel cell stack; and
a fluid supply pipe connecting unit mounted on the frame to reciprocate forward and backward with respect to a second side of the fuel cell stack, the fluid supply pipe connecting unit connecting a negative output cable of the electric load system to a negative output terminal on the second side of the fuel cell stack and connecting a fluid supply pipe of a fluid supply system to a manifold of the fuel cell stack.

19. The activation apparatus of claim 18, wherein the output cable connecting unit includes:
a moving body reciprocating forward and backward with respect to the first side of the fuel cell stack by an actuator; and
a connecting terminal set elastically installed in the moving body and connected to the positive output terminal of the fuel cell stack.

20. The activation apparatus of claim 19, wherein the moving body includes a pair of attachments which support the first side of the fuel cell stack.

* * * * *